US 10,453,191 B2

(12) United States Patent
Shalev et al.

(10) Patent No.: US 10,453,191 B2
(45) Date of Patent: Oct. 22, 2019

(54) AUTOMATED INTRAVASCULAR PLAQUE CLASSIFICATION

(71) Applicant: Case Western Reserve University, Cleveland, OH (US)

(72) Inventors: Ronny Y. Shalev, Pepper Pike, OH (US); David L. Wilson, Cleveland Heights, OH (US); Soumya Ray, Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 181 days.

(21) Appl. No.: 15/491,544

(22) Filed: Apr. 19, 2017

(65) Prior Publication Data
US 2017/0309018 A1 Oct. 26, 2017

Related U.S. Application Data

(60) Provisional application No. 62/325,151, filed on Apr. 20, 2016.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4647* (2013.01); *G06K 9/627* (2013.01);
(Continued)

(58) Field of Classification Search
None
See application file for complete search history.

(56) References Cited

U.S. PATENT DOCUMENTS

| 2014/0029839 | A1* | 1/2014 | Mensink | G06K 9/6272 382/159 |
| 2014/0160264 | A1* | 6/2014 | Taylor | G02B 21/008 348/79 |
| 2014/0193057 | A1* | 7/2014 | Zagrodsky | G06T 7/0012 382/131 |

OTHER PUBLICATIONS

G. J. Ughi et al., "Automated tissue characterization of in vivo atherosclerotic plaques by intravascular optical coherence tomography images," Biomed.Opt.Express 4(7), 1014-1030 (2013).
(Continued)

*Primary Examiner* — Sean M Conner
(74) *Attorney, Agent, or Firm* — Eschweiler & Potashnik, LLC

(57) ABSTRACT

Methods and apparatus automatically classify intravascular plaque using features extracted from intravascular optical coherence tomography (IVOCT) imagery. One example apparatus includes an image acquisition circuit that accesses a set of IVOCT images, a pre-processing circuit that generates a blood vessel mask based on the IVOCT images, a feature extraction circuit that defines a three dimensional (3D) volume of interest centered on a location in a member of the set of IVOCT images, a classification circuit that generates a classification based on a probability that a voxel represents a type of plaque, and a visualization circuit that provides a visualization, substantially in real time, of a member of the set of IVOCT images and the classification, where the visualization includes a sector classification image, a labeled image, or a 3D visualization. A prognosis or treatment plan may be provided based on the visualization or the classification.

17 Claims, 9 Drawing Sheets

(51) Int. Cl.
  *G06T 7/11*   (2017.01)
  *G06K 9/46*   (2006.01)
  *G06K 9/62*   (2006.01)

(52) U.S. Cl.
  CPC ............ *G06T 7/11* (2017.01); *G06K 2209/05* (2013.01); *G06T 2207/10101* (2013.01); *G06T 2207/30101* (2013.01)

(56) References Cited

OTHER PUBLICATIONS

Ronny Shalev et al., "Processing to determine optical parameters of atherosclerotic disease from phantom and clinical intravascular OCT 3D pullbacks," Journal of Medical Imaging (2016).

C. V. B. Lambros S. Athanasiou, George Rigas, Antonis I. Sakellarios, Themis P. Exarchos, Panagiotis K. Siogkas, Andrea Ricciardi, Katerina K. Naka, Michail I. Papafaklis, Lampros K. Michalis, Francesco Prati, Dimitrios I. Fotiadis, "Methodology for fully automated segmentation and plaque characterization in intracoronary optical coherence tomography images," (2014).

Z. Wang et al., "Semiautomatic segmentation and quantification of calcified plaques in intracoronary optical coherence tomography images," Journal of biomedical optics 15(6), 061711-061711 (2010).

M. Gargesha et al., "Parameter Estimation of Atherosclerotic Tissue Optical Properties from 3D Intravascular OCT" SPIE Journal of Medical Imaging 2(1), 14 (2015).

Z. Wang et al., "Automatic segmentation of intravascular optical coherence tomography images for facilitating quantitative diagnosis of atherosclerosis," 78890N-78890N. Proceedings of SPIE—The International Society for Optical Engineering • Feb. 2011.

\* cited by examiner

AUTOMATED INTRAVASCULAR PLAQUE CLASSIFICATION

CROSS REFERENCE TO RELATED APPLICATIONS

This application claims the benefit of U.S. Provisional Application 62/325,151 filed Apr. 20, 2016.

FEDERAL FUNDING NOTICE

This invention was made with government support under the grant(s) HL114406, HL108263, RR024989 awarded by the National Institutes of Health. The government has certain rights in the invention.

BACKGROUND

Cardiovascular disease accounts for millions of deaths around the world each year. Percutaneous coronary interventions (PCIs) are the most common coronary revascularization procedure, with over 500,000 Pas being performed in the United States alone each year. Cardiologists treat increasingly complex lesions with PCIs, including chronic total occlusions. However, conventional approaches to PCI may leave the cardiologist blind with respect to significant calcium and lipid deposits that could affect treatment.

Significant lipid or calcium deposits can affect a treatment plan for a patient undergoing PCI. For example, if a physician were aware of the extent of a lipid deposit, the physician could use a more appropriately sized stent to seal off the affected area and avoid placing the stent in a region prone to vessel dissection. In situations in which initial balloon inflation does not expand a calcified artery, the physician may apply high pressure, perform an atherectomy, or abort the procedure: all difficult decisions that would benefit from effective imaging support. Conventional imaging approaches to PCI that employ intravascular ultrasound, x-ray angiography, or fluoroscopy may show the vessel lumen, or possibly slight indications of potential calcifications. However, these approaches leave a cardiologist operating blindly with respect to the actual location, extent, and constituents of vascular lesions, especially when there is vessel remodeling.

Intravascular optical coherence tomography (IVOCT) has sufficient resolution, contrast, and penetration depth to characterize coronary artery plaques. IVOCT provides discrimination between lipid and fibrous plaque constituents, and has sufficient resolution and contrast to identify vulnerable thin cap atheromas. However, IVOCT requires extensive specialized training, which limits the number of physicians qualified to use IVOCT. Interpretation of IVOCT images is also difficult and can be time consuming. Furthermore, during a typical PCI, a single pullback may create over five hundred images, overloading the physician with data during an already stressful intervention.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
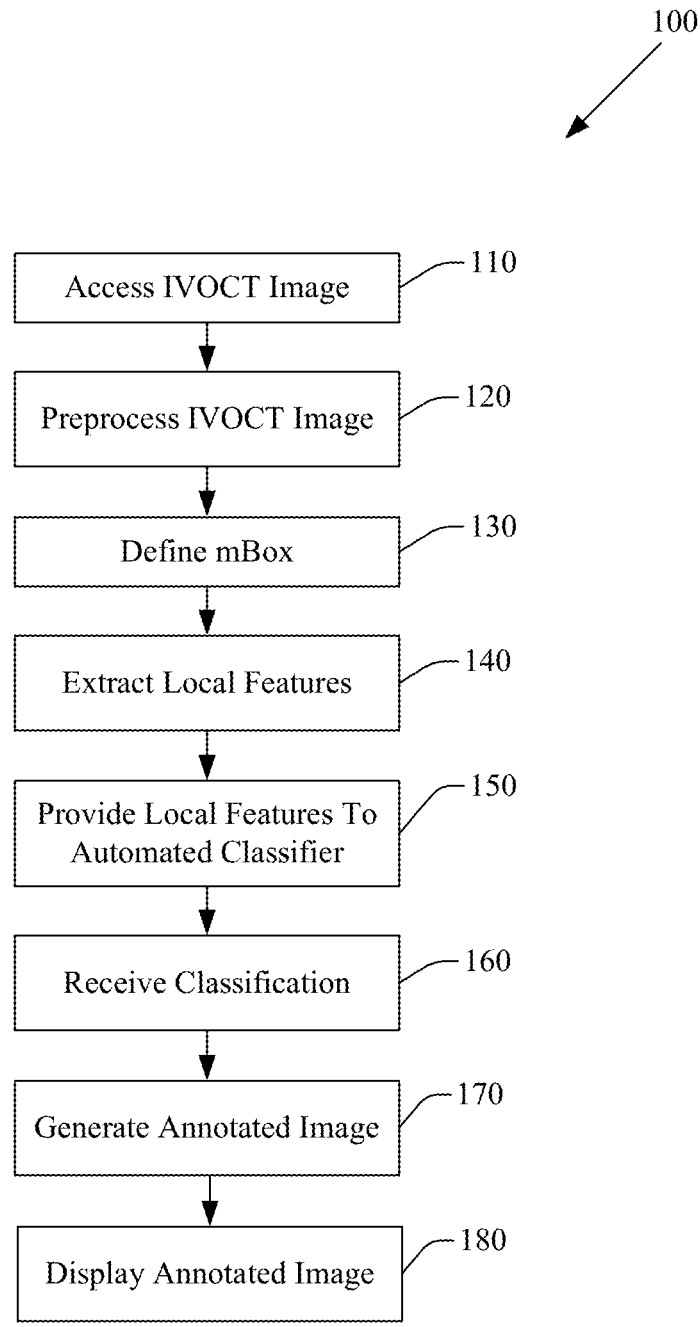
FIG. 1 illustrates an example method for automated intravascular plaque classification.

Example methods and apparatus automatically and substantially in real time classify plaque components represented in clinical IVOCT pullback imagery using a machine learning classifier. In one embodiment, the machine learning classifier includes a plurality of support vector machine (SVM) classifiers. In one embodiment, the SVM classifiers are binary SVM classifiers. Example methods and apparatus extract features within a three dimensional base of support from the clinical IVOCT pullback imagery. The set of features may include features based on optical property features, physics-based features, or pathology-based features, including intensity features. Example methods and apparatus may classify a region of tissue as fibrous, lipid, calcium, or other (i.e. other than fibrous, lipid, or calcium), using a one-versus-rest (OVR) SVM classifier or a plurality of OVR SVM classifiers. Example methods and apparatus may train an SVM classifier using a set of training data acquired from a plurality of pullbacks, where the set of training data includes a range of plaque morphology. Example methods and apparatus quantify parameters of clinical interest, including a plaque region's angular coverage or thickness. Example methods and apparatus generate a visualization of the region of tissue based on the IVOCT image. The visualization may include an annotated image or a 3D visualization of the region of tissue, where the annotated image or the 3D visualization illustrates the classification. Example methods and apparatus may control a PCI IVOCT system, a computer aided diagnosis (CADx) system, or other personalized diagnostic system to display the annotated image or 3D visualization of the region of tissue substantially in real time. Example methods and apparatus may further control a CADx system, or other personalized diagnostic system to generate a personalized treatment plan based on the classification, or the visualization.

Example methods and apparatus thus improve on conventional methods by more accurately classifying intravascular plaque.

By increasing the accuracy and speed with which intravascular plaque is classified, example methods and apparatus produce the concrete, real-world technical effect of reducing the time required to evaluate medical imagery while increasing the accuracy of the evaluation. Additionally, example apparatus and methods increase the probability that at-risk patients receive timely treatment tailored to the particular pathology they exhibit. Example methods and apparatus may also reduce the number of procedures needed to effectively treat patients. The additional technical effect of reducing the expenditure of resources and time on patients who are less likely to benefit from the treatment, or who are less likely to suffer recurrence or disease progression is also achieved. Example methods and apparatus thus improve on conventional approaches to intravascular plaque classification in a measurable, clinically significant way.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.).

FIG. 1 illustrates an example computerized method 100 for intravascular plaque classification. Method 100 includes, at 110, accessing an intravascular optical coherence tomography (IVOCT) image of a region of tissue. The IVOCT image includes a plurality of voxels. The IVOCT image may be of a region of tissue that includes a blood vessel. Accessing the IVOCT image may include retrieving electronic data from a computer memory, receiving a computer file over a computer network, or other computer or electronic based action.

Accessing the image may include accessing an IVOCT image acquired during a PCI pullback. In one embodiment, the IVOCT image may be acquired with a 1310 nm center wavelength, a 110 nm wavelength range, or a 50 kHz sweep rate. The IVOCT image may be acquired using a 20 mW output power. The IVOCT image may be acquired using a 12 mm coherence length. The IVOCT image may be acquired according to a set of pullback parameters. In one embodiment, the set of pullback parameters includes a pullback speed, a pullback length, a number of image frames, or an image frame spacing. For example, in one embodiment, the image may be acquired with a pullback speed of 20 mm/s, a pullback length of 54 mm, where the pullback includes at least 270 image frames spaced at least 200 μm apart. In another embodiment, other types or sizes of images, or other, different imaging or pullback parameters, may be employed. The IVOCT image includes a set of discriminative features that facilitate distinguishing plaque types. The set of discriminative features may include features based on optical properties, or physics or pathology based features.

Method 100 also includes, at 120, generating a pre-processed image. Method 100, at 120, pre-processes the IVOCT image to generate the pre-processed image. Generating the pre-processed image includes generating a blood vessel mask. Pre-processing the IVOCT image may include performing noise reduction, segmentation, pixel shifting, or other actions.

Method 100 also includes, at 130, defining a moving box (mBox) based on the pre-processed image and the blood vessel mask. The mBox defines a three-dimensional (3D) volume of interest (VOI) centered on a location in a view of the pre-processed image. The mBox includes at least one member of the plurality of voxels. Calculation at an mBox location extracts a vector of features, which defines a point in feature space. An mBox(i, j, k) may be defined as a 3D volume of interest centered at (i, j, k) in an (r, Θ, z) view of the IVOCT image. In one embodiment, the dimensions of the mBox are (11, 7, 3), while in another embodiment, other, different dimensions may be employed. In this example, in the direction of Θ and r, the units are in pixels. In the direction of the pullback (i.e., z, along the blood vessel) the unit is frames. Thus, an (11, 7, 3) mBox has a value of 11 pixels in the r direction, 7 pixels in the Θ direction, and is 3 frames deep. A scanning range of the mBox is based, at least in part, on the blood vessel mask. For example, processing may begin and end at points where the mBox fits just inside the blood vessel mask. In one embodiment, less than all the voxels defined by the mBox may be processed. For example, every other voxel, or every third voxel, may be processed. In one embodiment, some processing steps, including filtering or co-occurrence matrix computations, are done on the entire IVOCT image, before processing the mBox. Performing filtering or co-occurrence matrix calculations before processing the mBox may more efficiently utilize computational resources available to example methods and apparatus.

Method 100 also includes, at 140, extracting a set of local features from the at least one member of the plurality of voxels. Example methods and apparatus compute features from a voxel represented within the blood-vessel mask by processing within the local 3D neighborhood defined by the mBox. The set of local features includes discriminative features that distinguish between fibrous plaque, lipid plaque, and calcified plaque. In one embodiment, the set of local features include hand crafted features selected based on domain expertise. In another embodiment, the set of local features is determined by a classifier, where the classifier selects a discriminative subset of features from a larger set of features. A discriminative feature is a feature that demonstrates separation between different classes (e.g. lipid, calcium, fibrous). In a deep learning approach, discriminative features are not pre-specified as hand crafted features are, but are learned directly from the raw input data. For example, a classifier may employ feature selection techniques, including unsupervised clustering, Wilcoxon Rank sum testing, or local embedding approaches, to select discriminative features from the plurality of voxels.

Fibrous plaque demonstrates high backscattering and a relatively homogeneous IVOCT signal. High backscattering is captured by a high average intensity feature. A homogeneous IVOCT signal indicates low attenuation (a low value of $\mu_t$).

Lipid plaque presents a signal poor region within an atherosclerotic plaque, poorly delineated borders, a fast IVOCT signal drop-off, and little or no OCT signal backscattering, within a lesion that is covered by a fibrous cap. Lipid plaque features are captured with texture features, signal attenuation features, geometric features, or intensity features.

Calcified plaque appears as a signal-poor or heterogeneous region. A calcified plaque region may have a sharply delineated border at leading, trailing, or lateral edges. Calcium appears darker in IVOCT imagery than fibrous plaque, with greater variation in intensity level inside the region of interest.

The set of local features includes an optical feature set, an intensity variation feature set, or a spatial texture feature set. The set of local features discriminates between classes of plaque. The optical feature set includes physics-based features. In one embodiment, the optical feature set includes an attenuation coefficient feature $\mu_t$, a reflected intensity feature $I_0$, a distance to lumen feature $D_l$, a beam penetration depth feature $D_d$, a beam incident angle feature $\Theta_i$, or a mean intensity feature $\bar{I}$.

The attenuation coefficient feature $\mu_t$ is computed using a least squares approach. An A-line segment is fit within the mBox to estimate $\mu_t$ or $I_0$. To compute a robust estimate of $\mu_t$, example methods and apparatus compute a median across values of $\mu_t$, which results in clinically useful estimates even with pullbacks that have high levels of IVOCT noise. In one embodiment, values for $\mu_t$ and $I_0$ are computed by solving one equation.

The distance to lumen feature $D_l$ represents the distance from a voxel along the A-line to the segmented lumen border. The distance to lumen feature $D_l$ facilitates distinguishing lipid plaque because the average intensity rapidly falls off in lipid plaque.

The beam penetration depth feature $D_d$ represents the distance over which the OCT beam penetrates the tissue. The beam penetration depth feature $D_d$ further represents the distance from the front border to the back border. The back border is the depth in tissue where one obtains IVOCT image data higher than background noise.

The beam incident angle feature $\Theta_i$ represents the angle between the A-line and the normal to a tangent of the front border in the (r, $\Theta$) view prior to pixel shifting. When the OCT optical beam is not at a 90 degree angle with respect to the artery wall, light can be reflected away, affecting intensities along the A-line.

The mean intensity feature $\bar{I}$ represents the average signal intensity within the mBox.

In one embodiment, the intensity variation feature set includes a homogeneity feature H, a relative smoothness of intensity feature S, or an entropy feature E. The homogeneity feature H is a local coefficient of variation, $(\sigma/\bar{I})$, where $\sigma$ represents the standard deviation of intensity values within the mBox. The homogeneity feature H facilitates distinguishing heterogeneous intensity regions and homogeneous intensity regions.

The relative smoothness of intensity feature S may be defined as $S=1-(1/(1+\sigma^2))$ following normalization of the maximum intensity to 1.0. The relative smoothness of intensity feature S measures the relative smoothness of intensity in the region, and will have a value of 0 for constant intensity regions. The relative smoothness of intensity feature S approaches 1 for large deviations in intensity values.

Example methods and apparatus compute the entropy feature E by constructing a histogram of intensities within the mBox. The histogram of intensities is normalized to give probabilities of intensity $p(z_i)$ where $z_i$ is a gray scale value after pre-processing. Entropy is then computed from:

$$E = -\Sigma_{i=0}^{L-1} p(z) \log_2 p(z_i)$$

where $p(z_i)$ is the probability of the intensity level, $z_i$, $i=1, \ldots L$ for L bins in the histogram of intensity levels, where L is an integer. Within homogeneous regions the entropy will be low. Within heterogeneous regions the entropy will be higher than in homogeneous regions.

In one embodiment, the spatial texture feature set includes a contrast feature C, a correlation feature Cor, an energy feature E, or a co-occurrence homogeneity feature Hc. In another embodiment, the set of local features may include other, different features. The spatial texture features are extracted by sampling how a first set of grey-levels occur in relation to a second, different set of grey-levels using a co-occurrence matrix.

In one embodiment, the spatial texture features are extracted by defining 0 as an operator that defines the position of two pixels in the IVOCT image relative to each other. Consider an image $I(r,\Theta)$ with L possible intensity levels. Let co-occurrence matrix G be a matrix whose element $g_{ij}$ is the number of times that pixel pairs with raw intensities $z_i$ and $z_j$ occur in I at the position specified by O, where $1 \leq i, j \leq L$. The total number, n, of pixel pairs that satisfy O is equal to the sum of the elements of G. Then the quantity $$p_{ij} = \frac{g_{ij}}{n}$$

is an estimate of the probability that a pair of points satisfying O will have values $(z_i, z_j)$. Example methods and apparatus form a normalized co-occurrence matrix by dividing each of its terms by n. The number of possible intensity levels in the image determines the size of matrix G, and, thus has a direct impact on algorithm execution time. In one embodiment, the IVOCT images are 16-bit images and the number of intensity levels for co-occurrence matrix calculation is 64. The relative position function, O, is defined over an 8-neighbor region. In another embodiment, the IVOCT images may have other bit depths or other numbers of intensity levels, and O may be defined over other numbers of neighbors. In one embodiment, the time required to classify a region of intravascular plaque by example methods and apparatus may be adjusted by adjusting the number of intensity levels.

The contrast feature C measures the intensity contrast between a pixel and its neighbor over the mBox. C is zero over a constant mBox. The contrast feature C may be defined as $$C = \sum_{i=1}^{K} \sum_{j=1}^{K} (i-j)^2 p_{ij}$$

where K is the row or column dimension of G. The probability $p_{ij}$ is the ij-th element of G/n, mr is the mean computed over the rows and mc is the mean computed over the columns of the mBox.

The correlation feature Cor measures how correlated a pixel is to a neighbor pixel in the mBox. In one embodiment, the correlation feature Cor has a value in the range (-1, 1). The correlation feature Cor may be defined as $$Cor = \sum_{i=1}^{K} \sum_{j=1}^{K} \frac{(i-m_r)(j-m_c) p_{ij}}{\sigma_r \sigma_c}$$

where $\sigma_r \neq 0$ is the standard deviation measured along rows of the mBox and $\sigma_c \neq 0$ is the standard deviation measured along columns of the mBox. Cor will have a value of 1 for a perfectly positively correlated mBox or -1 for a perfectly negatively correlated mBox. Cor will be undefined for a constant mBox, since the denominator $\sigma_r \sigma_c$ would be zero.

The energy feature E may be defined as:

$$E = \sum_{i=1}^{K} \sum_{j=1}^{K} p_{ij}^2.$$

The energy feature E has a range of [0, 1], where the energy feature E equals one for a constant mBox.

The co-occurrence homogeneity feature Hc represents the value of the closeness of the distribution of elements in the co-occurrence matrix G to the diagonal of G. The co-occurrence homogeneity feature Hc may be defined as:

$$Hc = \sum_{i=1}^{K} \sum_{j=1}^{K} \frac{p_{ij}}{1+|i-j|}.$$

Method 100 also includes, at 150, providing the set of local features to a machine learning classifier. Providing the set of local features to the machine learning classifier may include retrieving electronic data from a computer memory, receiving a computer file over a computer network, or other computer or electronic based action. In one embodiment, the deep learning classifier is an SVM classifier. The SVM classifier may be a binary SVM classifier. In other embodiments, other types, combinations, or configurations of automated deep learning classifiers may be employed. The machine learning classifier classifies the voxel based on the set of local features. In one embodiment, the machine learning classifier includes a plurality of SVMs. The plurality of SVMs may be a plurality of one-versus-the-rest (OVR) SVMs. The plurality of OVR SVMs includes an OVR-lipid (OVR-L) classifier, an OVR-calcium (OVR-C) classifier, and an OVR-fibrous (OVR-F) classifier. A member of the plurality of OVR SVMs classifies a voxel based on a probability threshold and the set of local features. In one embodiment, the probability threshold is computed using a minimum squared distance (MSD) approach. In another embodiment, the probability threshold is computed using a Youden index approach. In another embodiment, the probability threshold may be computed using another, different approach.

In one embodiment, a vector of features for a voxel is generated from the mBox calculations described above. Example methods and apparatus normalize a feature by subtracting the mean of the feature and dividing it by its standard deviation. Example SVMs may include a maximum-margin linear classifier that has provably good generalization bounds. SVM training is formulated in terms of a quadratic program (QP) which is optimized by a numerical solver. The SVM uses a linear discriminant function of the form: $f(x) = w^T + b$ where the vector w is the weight vector and b is the offset and x is the point in feature space. The objective function trades off two quantities: the margin, which is the distance from the separating plan and which is inversely proportional to $\|w\|$, and the loss arising from misclassifying training instances. Constraints in the quadratic program reflect the fact that the training data should be classified correctly as fast as possible. Therefore, the cost function optimized by the SVM is $$\mathrm{argmin}_{w, \xi_1} \frac{1}{2} \|w\|^2 + C \sum_{i=1}^{N} \xi_1,$$

such that $y_i(w^T x_i + b) \geq 1 - \xi_1$, $\xi_1 \geq 0$, where C is a positive parameter that sets the relative importance of maximizing the margin and maximizing the amount of slack, $y_i$ is the true label, $x_i$ is the feature vector, and $\xi_1$ is the slack associated with the training example i.

Decision boundaries that are nonlinear in x may be constructed through the use of a nonlinear feature map, $\varphi(x)$. When the quadratic program above is rewritten with $\varphi(x)$ and converted into dual form, the solution appears in the form of the dot product, $\varphi(x)\varphi(y)$, which is defined to be the kernel function, k(x,y). The kernel matrix can be constructed efficiently even when the feature maps $\varphi(x)$ are very complex or even infinite-dimensional. This allows the SVM to efficiently produce classifiers that are high dimensional and nonlinear with respect to the original data.

In one embodiment, example methods and apparatus use a radial basis function (RBF) kernel. The RBF kernel may be defined as:

$$k(x_i, y_j, \gamma) = \exp\left( \frac{\|x_i - x_j\|}{2\gamma^2} \right)$$

where $x_i$ and $x_j$ are the feature vectors, and $\gamma$ controls the width of the kernel. Thus $\gamma$ controls how far the influence of a single training example reaches.

Example embodiments employ OVR SVM classifiers. In one embodiment that classifies three plaque types, three OVR SVM classifiers are employed. Since each class (e.g. lipid, calcified, fibrous) is represented by one classifier, example methods and apparatus facilitate acquiring clinical knowledge about a particular class by inspecting its corresponding classifier.

A voxel may belong to one of the plaque classes, or may be classified as "other". In some situations, the majority of voxels will not belong to one of the plaque classes, and will be classified as other. Example embodiments may employ different approaches to classifying "other" voxels. In one embodiment, a fourth class, "other", is defined, and an OVR-O is created and trained according to methods described herein. This approach is called "4-CLASS". 4-CLASS uses a winner-take-all strategy whereby the classifier having the highest probability wins the voxel.

In another embodiment, example methods and apparatus develop probability thresholds for the three OVR models that appropriately leave voxels in the "other" category. Example methods and apparatus may classify any given voxel as one of the three main plaque types upon a threshold level of confidence in its membership. When a threshold level of confidence is not achieved, example methods and apparatus may classify the voxel as "other." If more than one class claims membership for a voxel, example methods and apparatus elicit a tie-breaker and select the classifier with the widest margins in feature space.

Example methods and apparatus may employ different approaches to computing threshold probabilities, including approaches that refer to the receiver operating characteristic (ROC) curve. In one embodiment, example methods and apparatus determine the minimum squared distance to the theoretically optimum, upper left hand corner of the ROC at (0, 1). For a point along the ROC, example methods and apparatus compute distance squared, d2, as:

$$d2=(1-TPR)^2+FPR^2=(1-Sn)^2+(1-Sp)^2$$

where Sn represents sensitivity, and Sp represents specificity. The SVM probability output corresponding to the minimum squared distance is chosen as the threshold. This approach with rejection of other voxels using a minimum squared distance threshold is called 3-CLASS-MSD.

In another embodiment, example methods and apparatus employ a Youden index to compute the threshold probability, which maximizes the vertical distance between points on the ROC and the diagonal, chance line. In this embodiment, example methods and apparatus compute J=Sn+Sp−1, maximize it along the ROC curve, and equate the threshold to the SVM output probability which maximizes J. By maximizing J, example methods and apparatus maximize (Sn+Sp) across various cut-off points. Values vary between 0 and 1, where a value of 1 again refers to a point at the idealized upper left hand corner of the ROC. This 3-class approach with rejection of other voxels using a threshold derived from the Youden index is called as 3-CLASS-YOUDEN.

An SVM may have a plurality of parameters that define the operation of the SVM. In one embodiment, the SVM has two parameters, C and γ. In this embodiment, C is a regularization parameter that trades off margin size and training error, and γ is the Radial Basis Function (RBF) Gaussian kernel's bandwidth. These parameters may be optimized.

Method 100 also includes, at 160, receiving, from the machine learning classifier, a classification of the voxel. Receiving the classification may include receiving a classification of the voxel as lipid, calcium, or fibrous. Receiving the classification may also include receiving a classification of the voxel as "other". In another embodiment, other classifications may be received. Receiving the classification may include retrieving electronic data from a computer memory, receiving a computer file over a computer network, or other computer or electronic based action.

Figure 3:
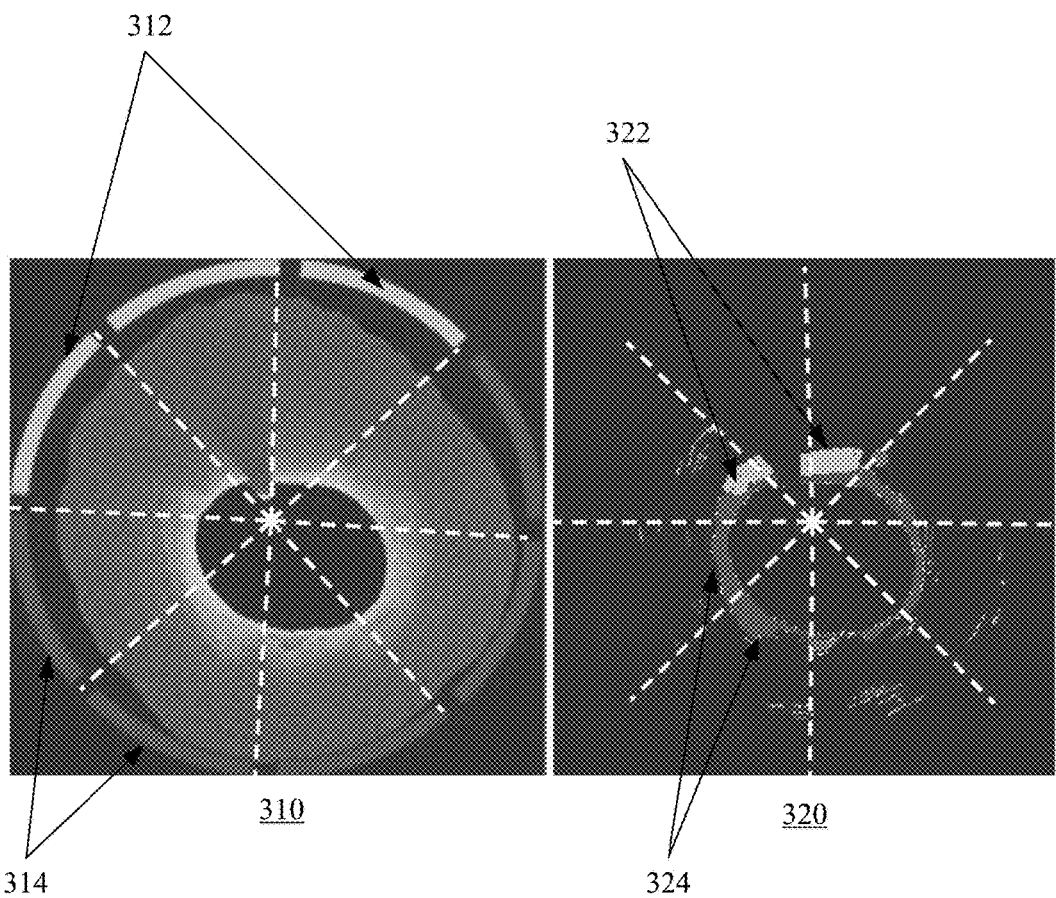
FIG. 3 illustrates example annotated images of intravascular plaque.
Figure 4:
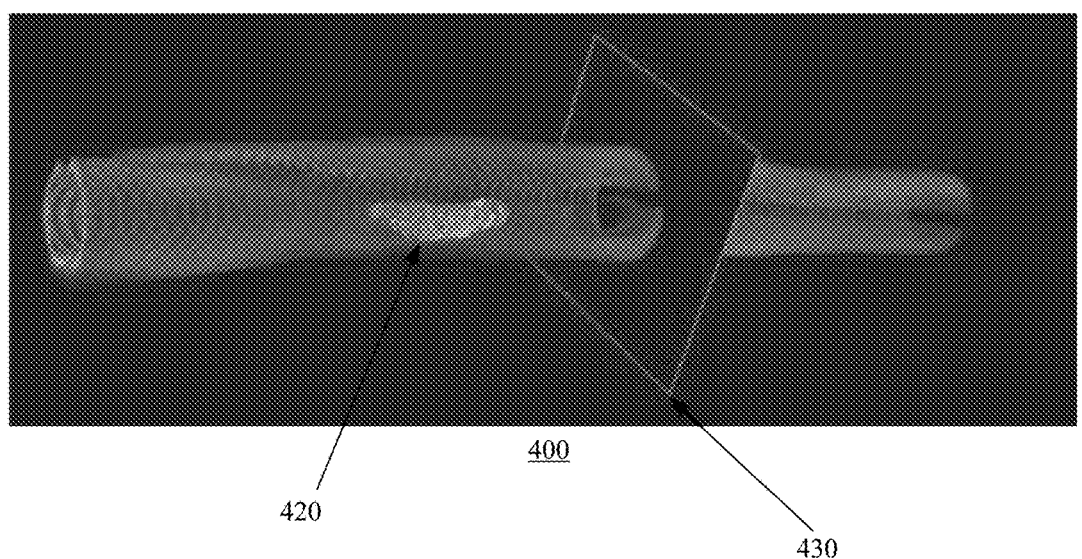
FIG. 4 illustrates an example 3D visualization of a blood vessel.

Method 100 also includes, at 170, generating an annotated image of the region of tissue based on the classification. The annotated image may include a sector classification image of the region of tissue, a labeled image of the region of tissue, or a three dimensional (3D) volumetric visualization of the region of tissue. The sector classification image includes a masked frame of the region of tissue. The masked frame includes a plurality of sectors. A sector includes a representation of a type of plaque detected in the sector, and a representation of the classification displayed at the perimeter of the sector. FIG. 3 illustrates an example sector classification image 310 divided into eight sectors. Sector classification image 310 includes eight sectors. Sector classification image 310 also includes arcs 312 and arcs 314 at the perimeter of the blood vessel. Arcs 312 and arcs 314 indicate the classification of the sector. In another embodiment, other techniques for indicating the classification of the sector may be employed. FIG. 3 also illustrates an example labeled image 320. The labeled image 320 of the region of tissue includes region 322 and region 324. Rather than indicate at the perimeter of the image of the blood vessel the classification, labeled image 320 indicates the classification of the region directly on the representation of the region. The 3D volumetric visualization includes an overlay that indicates a plaque type within the volume. FIG. 4 illustrates an example 3D volumetric visualization 400.

Example methods and apparatus thus facilitate visually conveying plaque classifications in a clinical setting. Embodiments described herein may convey a plaque characterization as a sector classification as illustrated in FIG. 3, element 310, as labeled images as in FIG. 3, element 320, and as a 3D visualization as illustrated in FIG. 4. All of these visualization approaches may be interactive. For example, in one embodiment a slider may be used to move forward and backward through the image stack (e.g. along z) while viewing sector markings as illustrated by FIG. 3, element 310. With a "slicer" tool, one can cut the 3D rendering (FIG. 4) to examine the vessel in a longitudinal cut 430 to reveal plaque structures 420 from inside the lumen looking out. In one embodiment, IVOCT imagery is registered with angiography, facilitating the creation of a visualization in which plaque may be visualized at different points along the arterial tree. An advantage of the simple sector display (e.g. FIG. 3, element 310) is that a physician can see the result of automated classification substantially in real time and verify the result with her own interpretation of the image.

Method 100 further includes, at 180, controlling a PCI apparatus to display the annotated image. In one embodiment, method 100 controls the PCI apparatus to display the annotated image substantially in real time. Displaying the annotated image substantially in real time may include displaying the sector classification image, displaying the labeled image of the region of tissue, or displaying a three dimensional (3D) volumetric visualization of the region of tissue.

In one embodiment, method 100 further includes controlling a computer aided diagnosis (CADx) system to classify the region of tissue according to plaque type. The CADx system classifies the region of tissue based, at least in part, on the classification, the annotated image, or the set of local features. In one embodiment, method 100 also controls the CADx system to generate a personalized treatment plan for the patient from whom the image was acquired. The personalized treatment plan facilitates the timely, efficient, and accurate application of stents or other treatment modalities. The personalized treatment plan may include, for example, locations at which to apply a stent.

In another embodiment, method 100 further includes generating a post-processed image. The post-processed image may be generated by applying a sized-based filter to the annotated image. Voxel-wise classification may be noisy. Clinically useful application of IVCOT imagery requires classification over regions much larger than a voxel. Thus, embodiments described herein may perform multi-class noise cleaning. In one embodiment, example methods and apparatus perform post-classification smoothing on the binary images that from each of the OVR classifiers using a size-based filter. In this approach, a region that has an area less than a threshold area is defined as noise. The threshold area may be a user-defined threshold area. If a noise region has the same classification as the background, it is called "interior noise", otherwise, it is called "exterior noise". Size-based removal merges interior noise into corresponding fields and removes exterior noise.

While FIG. 1 illustrates various actions occurring in serial, it is to be appreciated that various actions illustrated in FIG. 1 and other figures described herein could occur substantially in parallel. By way of illustration, a first process could access an IVOCT image, a second process could define an mBox, and a third process could classify the region of tissue represented in the IVCOT image. While three processes are described, it is to be appreciated that a greater or lesser number of processes could be employed and that lightweight processes, regular processes, threads, and other approaches could be employed.

Figure 2:
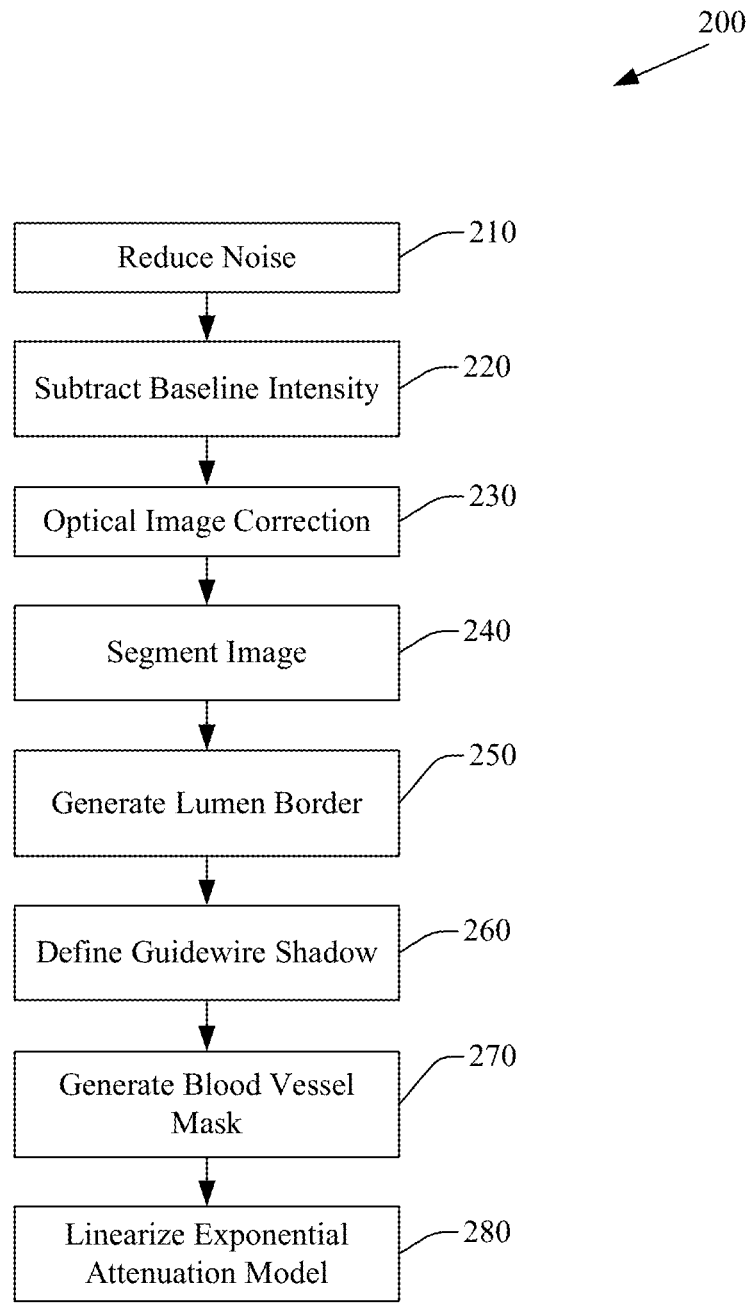
FIG. 2 illustrates an example method for pre-processing an IVOCT image.

FIG. 2 illustrates an example method 200 for generating a pre-processed image. In one embodiment, pre-processing may follow IVOCT A-lines in (r, Θ) images. Method 200 includes, at 210, generating a noise reduced image based on the intravascular image. The noise reduced image may be generated using an enhanced Lee filter optimized for speckle noise. In another embodiment, other noise reduction techniques may be used.

Method 200 also includes, at 220, subtracting a baseline intensity from the noise reduced image.

Method 200 also includes, at 230, correcting the noise reduced image using optical image system correction. In another embodiment, other correction approaches may be employed.

Method 200 also includes, at 240, generating a segmented image. Generating the segmented image includes segmenting a lumen or a back border from the noise reduced image. In one embodiment, a modified dynamic programming approach may be employed to segment the lumen and back border from the noise reduced image. In another embodiment, other segmentation approaches may be employed. For example, other segmentation approaches appropriate for segmenting a lumen or a back border may include thresholding, compression, clustering, histogram based segmentation, or other parametric or non-parametric segmentation approaches.

Method 200 also includes, at 250, generating a lumen border. Generating the lumen border includes correcting for catheter eccentricity with respect to a vessel wall. The lumen border may be a vertical lumen border. In one embodiment, correcting for catheter eccentricity includes pixel shifting an A-line along r.

Method 200 also includes, at 260, defining a guide wire shadow in the segmented image. A guide wire shadow may obscure a view of the vessel wall. Thus, segmenting the guide wire shadow improves the image quality, which increases the accuracy with which example methods and apparatus classify intravascular plaque. In one embodiment, the guide wire shadow is defined using an automated dynamic programming approach. In another embodiment, other approaches may be employed to segment the guide wire shadow from the image.

Method 200 also includes, at 270, generating the blood vessel mask. The blood vessel mask is based on the guide wire shadow, the lumen border, and the back border.

Method 200 also includes, at 280, linearizing an exponential attenuation model of an IVOCT signal. In one embodiment, the exponential attenuation of the IVOCT signal may be expressed as $I_d(r)=I_0 \exp(-\mu_t r)$. Linearizing the exponential attenuation model includes taking natural logarithms such that $\ln(I_d(r))=\ln(I_0)-\mu_t r$, where r is the distance from a catheter lens, $I_d$ is a detected signal, $I_o$ is the incident intensity of the beam, and $\mu_t$ is an attenuation coefficient of the beam.

Figure 5:
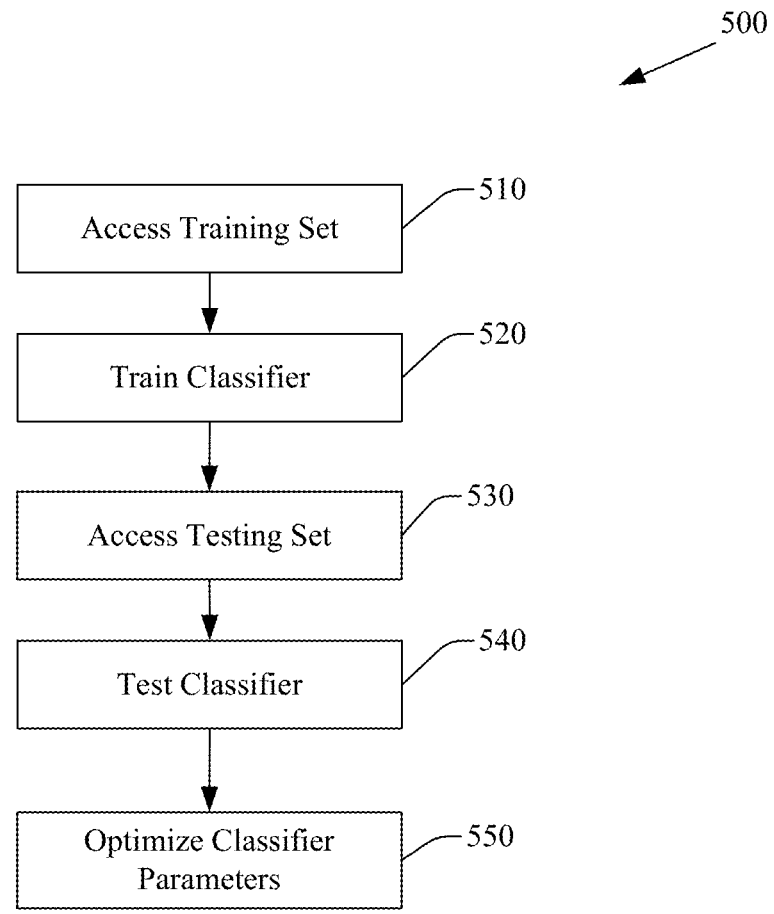
FIG. 5 illustrates an example method for training a machine learning classifier.

FIG. 5 illustrates an example method 500 for training an automated machine learning classifier, including a binary SVM classifier. The SVM classifier may be an OVR-L classifier, an OVR-C classifier, or an OVR-F classifier. Method 500 includes, at 510 accessing a training set of images. Accessing the training set of images may include accessing a clinical training data set by retrieving electronic data from a computer memory, receiving a computer file over a computer network, or other computer or electronic based action. The clinical training data set includes a set of PCI pullbacks.

In one embodiment, the clinical training data set may be acquired from de-identified clinical images acquired for other purposes. An expert may review pullbacks and identify homogenous volumes of interest (VOIs) for a fibrous, lipid, or calcified plaque types. VOIs may be marked with free-hand brush strokes on images in the (r,θ) view. In this embodiment, at least 300 VOIs from 35 pullbacks are employed. VOIs used in the clinical training data set may be of various sizes and shapes. In one embodiment, a VOI consists of 2 to 5 image frames, 50-200 A-lines, and 20-50 sample points in each A-line. In another embodiment, other configurations of clinical training data sets may be employed.

Method 500 also includes, at 520, training the OVR-L classifier, the OVR-C classifier, or the OVR-F classifier using the clinical training data set. Training the machine learning classifier may include determining that a threshold amount of training data is used to train the classifier. For example, in one embodiment, a learning curve analysis is applied to the training data. In this approach, embodiments described herein split the clinical training dataset into two parts: 20%, which is used as a test set, $D_{test}$, and 80%, $D_{train}$, from which random examples are drawn. Embodiments may select n samples (n=1, 2, 3, . . . , size($D_{train}$)) from $D_{train}$, and perform on it a 5-fold cross validation, resulting in a model (in a fold, the model with the highest performance accuracy measure is chosen). Then, the model's performance is tested on the same n samples, yielding the training error, $J_t$, and on $D_{test}$, yielding the testing error, $J_{test}$. As n increases, $J_{train}$ and $J_{test}$ should converge. Example embodiments use stratified 5-fold cross validation when randomly dividing the examples into training and cross validation in each fold. Stratified 5-fold cross validation means that each fold contains roughly the same proportions of the class labels. In another embodiment, other validation approaches may be used.

Method 500 also includes, at 530, accessing an independent validation set. In one embodiment, the independent validation set includes a set of voxels labeled using a 3D cryo-imaging approach. Accessing the independent validation set may include retrieving electronic data from a computer memory, receiving a computer file over a computer network, or other computer or electronic based action.

Voxels in the independent validation set may be labeled and validated by 3D cryo-imaging. The validation training data set may be obtained from coronary arteries (LADs) of human cadavers within 72 hours of death and stored at 4° C. To prepare for IVOCT imaging, arteries may be trimmed to approximately 10 cm in length. A luer is then sutured to the proximal end of a vessel which is flushed with saline to remove blood from the lumen. Major side branches and the distal end of each artery are sutured shut. Using super glue (e.g., cyanoacrylate adhesive), the artery is adhered to the sides and bottom of a rig that is used to minimize motion between cryo and IVOCT imaging procedures. IVOCT imaging conditions mimic the in-vivo acquisitions described above. Sutures are placed on the vessel to identify ROIs (1.5-2 cm in length) that are later analyzed using cryo-imaging. Following IVOCT imaging, the imaging rig containing the artery is flash frozen in liquid nitrogen, and stored at −80° C. until cryo-imaging is performed. Prior to cryo-imaging, arteries are cut into blocks corresponding to the ROIs determined during IVOCT imaging. Blocks are placed in the cryo-imaging system and allowed to equilibrate to the −20° C. cutting temperature. The ROIs are then alternately sectioned and imaged at 20 μm cutting intervals, and color and fluorescent cryo-images are acquired at a slice.

Cryo-imaging fills the gap between 3D IVOCT pullbacks and 2D histology. A cryo-imaging system suitable for use by embodiments described herein for generating an independent validation set includes a modified cryo-microtome with an integrated microscopic imaging system. The system serially sections and acquires micron-scale episcopic color and auto fluorescence microscopy images along the vessel. Microscopic resolution color/fluorescence volume renderings of vessels, in which plaque architecture and components are fully preserved, are generated. This provides an accurate depiction of the vessel without the limitations of conventional histological fixation and processing (e.g., shrinkage, spatial distortion, missing calcifications, missing lipid pools, tears, and so on). Cryo-imaging provides 3D validation for volumetric IVOCT pullback. Furthermore, in situations where plaque type may be ambiguous, cryo-imaging enables acquisition of standard cryo-histology. To further simulate the clinical application, ex-vivo IVOCT images may be acquired for the independent validation set using different catheters and with different eccentricities with respect to the vessel wall. A range of plaque morphologies may also be included.

Method 500 also includes, at 540, testing the OVR-L classifier, the OVR-C classifier, or the OVR-F classifier using the independent validation set. Testing the OVR-L classifier, the OVR-C classifier, or the OVR-F classifier may include determining that the classifier has not more than a 50% false positive error rate. In another embodiment, other false positive error rates may be employed.

In one embodiment, testing an OVR classifier includes generating ROC curves for the OVR classifier using a stratified 5-fold cross validation experiment on the clinical training dataset. From an ROC curve, example methods and apparatus compute the area under the curve, or AUC. Example methods and apparatus compute probability thresholds and compute sensitivities and specificities at thresholds, across all folds, or across less than all folds. To further assess classifier generalizability, example embodiments may perform a leave-one-pullback-out (LOPO) test. In this example, 35 different pullbacks are employed. In this example, the training set includes the 34 other pullbacks. This is a more stringent, realistic test as opposed to conventional random partitions. Example embodiments may compute the quality of classification by using TP (true positive), FN (false negative), and computing specificity, $Sp=TN/(FP+TN)$, and sensitivity (percentage of correctly classified pixels of all of the true, manually annotated pixels) with $Sn=TP/(TP+FN)$.

Method 500 further includes, at 550, optimizing a set of classifier parameters. In one embodiment, the set of classifier parameters is optimized based on a 5-fold stratified cross validation of the clinical training data set. In another embodiment, the set of classifier parameters may be optimized using another, different optimization approach.

In one embodiment, optimizing the set of classifier parameters includes implementing a grid search using 5-fold stratified cross validation on approximately 11,000 data points (roughly 33% for each plaque type) extracted from the clinical training dataset described above. For example, an SVM classifier may be trained on 80% of randomly selected voxels using a pair $(C, \gamma)$, and then performance tested on the held-out 20% to identify parameters that maximize performance on the held out set. Different classifier parameter pairs $(C, \gamma)$ may be evaluated in a grid search using exponential sequences of C and γ. For example, $C=2^{-5}, 2-3, \ldots, 2^{15}, \gamma=2^{-15}, 2^{-13}, \ldots, 2^3$. Optimum values may be, for example: $C=8.5742$ and $\gamma=0.1015$. In another embodiment, other numbers of data points may be employed for 5-fold stratified cross validation.

In one example, a method may be implemented as computer executable instructions. Thus, in one example, a computer-readable storage medium or a computer-readable storage device may store computer executable instructions that if executed by a machine (e.g., computer, processor) cause the machine to perform methods described or claimed herein including method 100, method 200, method 500, or method 700. While executable instructions associated with the listed methods are described as being stored on a computer-readable storage medium or computer-readable storage device, it is to be appreciated that executable instructions associated with other example methods described or claimed herein may also be stored on a computer-readable storage medium or computer-readable storage device. In different embodiments the example methods described herein may be triggered in different ways. In one embodiment, a method may be triggered manually by a user. In another example, a method may be triggered automatically.

Figure 6:
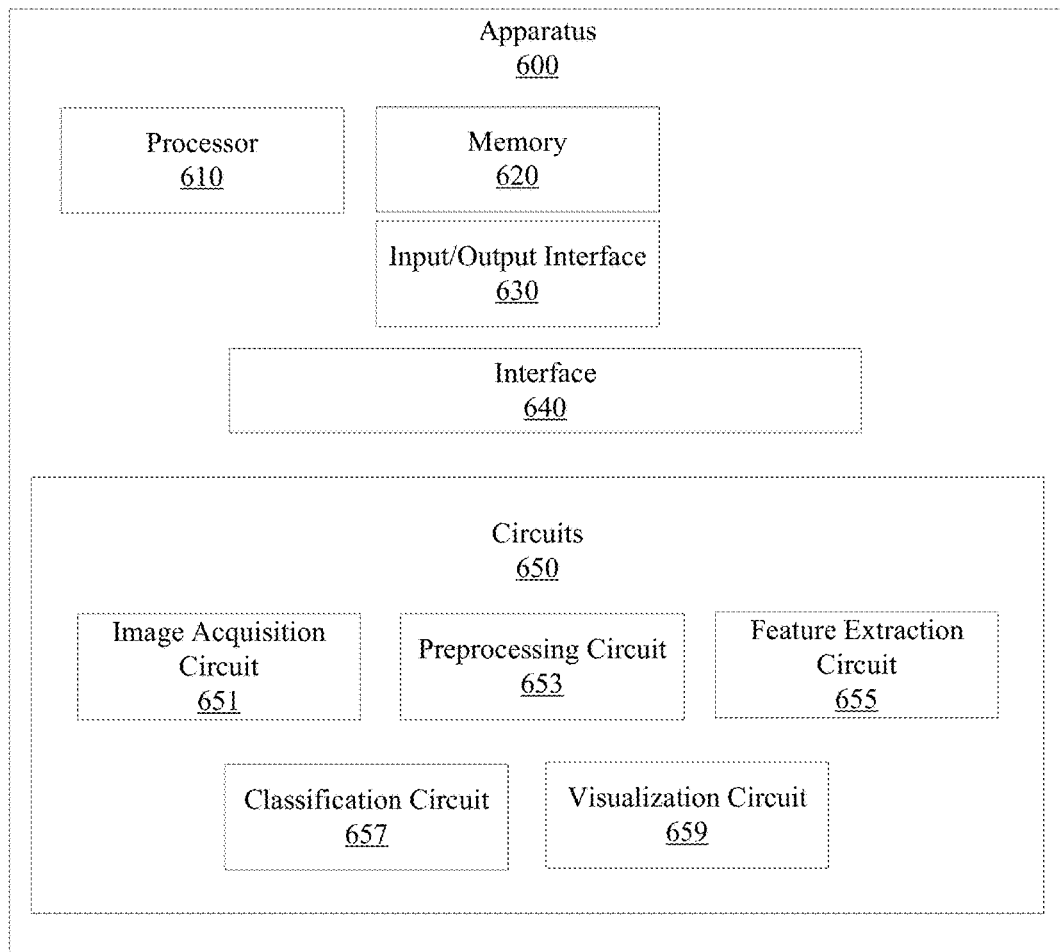
FIG. 6 illustrates an example apparatus that classifies intravascular plaque.

FIG. 6 illustrates an example apparatus 600 for classifying intravascular plaque. Apparatus 600 includes a processor 610, a memory 620, an input/output (I/O) interface 630, a set of circuits 650, and an interface 640 that connects the processor 610, the memory 620, the I/O interface 630, and the set of circuits 650. The set of circuits 650 includes an image acquisition circuit 651, a preprocessing circuit 653, a feature extraction circuit 655, a classification circuit 657, and a visualization circuit 659. In one embodiment, the functionality associated with the set of circuits 650 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of circuits 650 are implemented as ASICs or SOCs.

Image acquisition circuit 651 circuit accesses a set of intravascular optical coherence tomography (IVOCT) images of a region of tissue. The region of tissue includes a blood vessel. Accessing the set of IVOCT images may include retrieving electronic data from a computer memory, receiving a computer file over a computer network, or other computer or electronic based action. A member of the set of IVOCT images includes a plurality of voxels. In one embodiment, the image acquisition circuit acquires the set of IVOCT images during a PCI pullback. The PCI pullback may be defined by a set of parameters. The set of parameters may include a pullback speed, a pullback length, a number of image frames, or an image frame spacing. In one embodiment, the PCI pullback has a pullback speed of 20 mm/s, a pullback length of 54 mm, and the pullback includes at least 270 image frames spaced at least 200 µm apart. In one embodiment, a member of the set of IVOCT images is acquired using a 1310 nm center wavelength and a 110 nm wavelength range. The member of the set of IVOCT images may be acquired using a 50 kHz sweep rate, a 20 mW output power, or a 12 mm coherence length. In another embodiment, the PCI pullback or the member of the set of IVOCT images may be acquired using other, different parameters.

Preprocessing circuit 653 generates a blood vessel mask based on the set of IVOCT images. Preprocessing circuit 653 provides the blood vessel mask to the feature extraction circuit 655. Providing the blood vessel mask to the feature extraction circuit 655 may include retrieving electronic data from a computer memory, receiving a computer file over a computer network, or other computer or electronic based action. In one embodiment, preprocessing circuit 653 generates the blood vessel mask according to the steps outlined with respect to method 200. In another embodiment, other approaches, including other, different segmentation approaches, may be employed to generate the blood vessel mask.

Feature extraction circuit 655 defines a moving box (mBox). The mBox defines a 3D volume of interest centered on a location in a member of the set of IVOCT images. The mBox includes at least one member of the plurality of voxels. The mBox is defined by a set of dimensions and the blood vessel mask. The feature extraction circuit 655 extracts a set of discriminative features from the at least one member of the plurality of voxels. The feature extraction circuit provides the set of discriminative features to the classification circuit 657. Providing the set of discriminative features to the classification circuit 657 may include retrieving electronic data from a computer memory, receiving a computer file over a computer network, or other computer or electronic based action.

In one embodiment, the set of discriminative features includes an optical feature set, an intensity variation feature set, or a spatial texture feature set. The optical feature set includes an attenuation coefficient feature, a reflected intensity feature, a distance to lumen feature, a beam penetration depth feature, a beam incident angle feature, or a mean intensity feature. The intensity variation feature set includes a homogeneity feature, a relative smoothness of intensity feature, or an entropy feature. The spatial texture feature set includes a contrast feature, a correlation feature, an energy feature, or a co-occurrence homogeneity feature. In another embodiment, the set of discriminative features may include other features, other numbers of features, or other combinations of features.

Classification circuit 657 generates a classification of the voxel as a type of plaque based on a probability that the voxel represents the type of plaque. The probability is based, at least in part, on the set of discriminative features. In one embodiment, classification circuit 657 includes a plurality of one-versus-the-rest (OVR) SVMs. A first member of the plurality of OVR SVMs is an OVR-lipid (OVR-L) classifier, a second, different member of the plurality of OVR SVMs is an OVR-calcium (OVR-C) classifier, and a third, different member of the plurality of OVR SVMs is an OVR-fibrous (OVR-F) classifier. In this embodiment, a member of the plurality of OVR SVMs classifies a voxel based on a probability threshold and the set of local features. The classification circuit 657 computes the probability threshold using a minimum squared distance (MSD) approach, or a Youden index approach. The OVR-L classifier, the actions performed by the OVR-C classifier, or the OVR-F classifier are defined, at least in part, by a regularization parameter and a radial basis function (RBF) Gaussian kernel.

Visualization circuit 659 provides a visualization to a display, substantially in real time, of a member of the set of IVOCT images. Visualization circuit 659 may also provide the classification to the display. The visualization includes a sector classification image, a labeled image, or a 3D visualization. Visualization circuit 659 may display the member of the set of IVOCT images, the visualization, or the classification on a computer monitor, a smartphone display, a tablet display, or other displays. Displaying the member of the member of the set of IVOCT images, the visualization, or the classification may also include printing the member of the set of IVOCT images or the classification. Visualization circuit 659 may also control a CADx system to display a member of the set of IVOCT images, the visualization, or the classification. By classifying plaque represented in the set of IVOCT images, and by displaying the member of the set of IVOCT images, the visualization, or the classification, example apparatus provide a timely and intuitive way for a human to more accurately classify pathologies demonstrated by a patient, and to prepare a personalized treatment plan for the patient, thus improving on conventional approaches to classifying intravascular plaque or conventional approaches to planning treatment for intravascular plaque.

Figure 7:
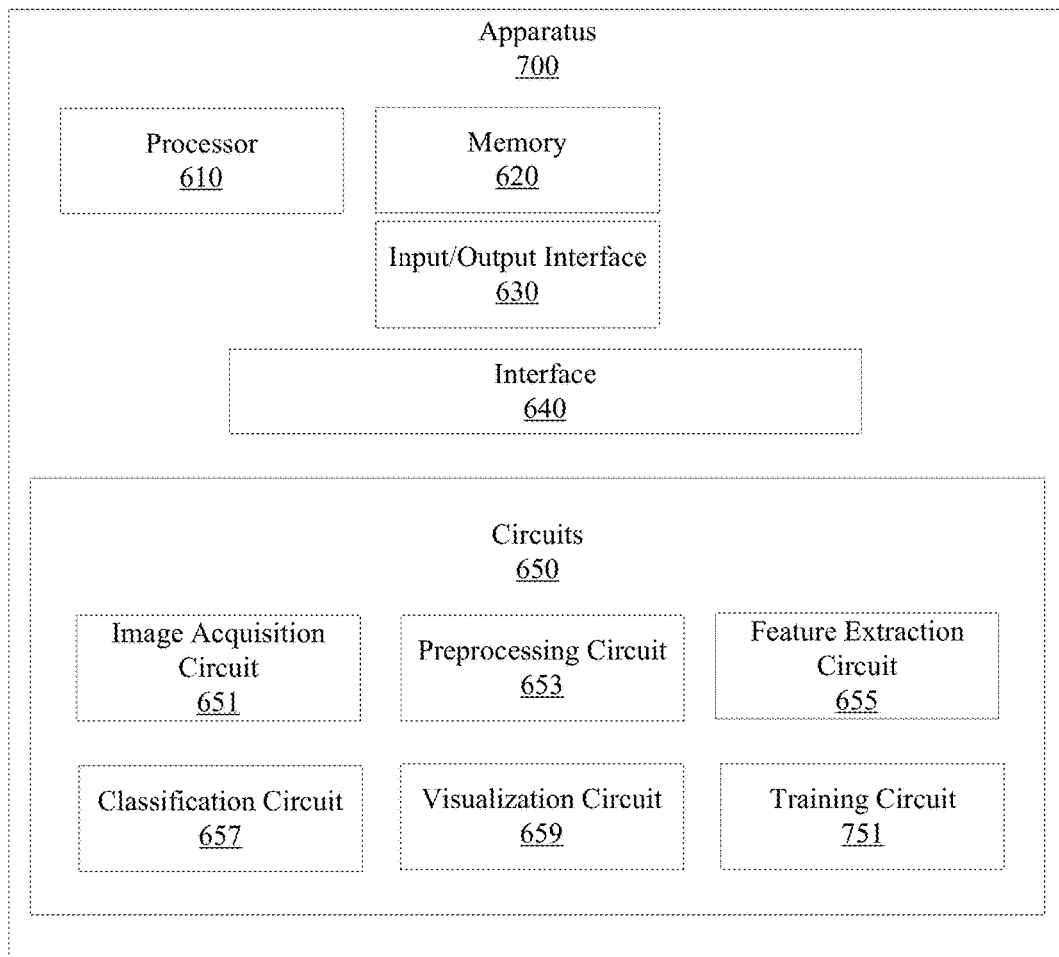
FIG. 7 illustrates an example apparatus that classifies intravascular plaque.

FIG. 7 illustrates an apparatus 700 for classifying intravascular plaque. Apparatus 700 is similar to apparatus 600 but includes additional elements. Apparatus 700 includes training circuit 751. The training circuit 751 trains the classification circuit 657 using a training set of images. The training circuit 751 accesses the training set. Accessing the training set may include retrieving electronic data from a computer memory, receiving a computer file over a computer network, or other computer or electronic based action. The training set may be stored, for example, in memory 620. A first member of the training set represents a region of tissue demonstrating lipid plaque. A second member of the training set represents a region of tissue demonstrating calcification. A third member of the training set represents a region of tissue demonstrating fibrous plaque.

In one embodiment, training circuit 751 tests classification circuit 657 using a set of independent testing images. In this embodiment, a member of the set of independent testing images includes a VOI labeled as lipid plaque, a VOI labeled as calcified plaque, or a VOI labeled as fibrous plaque. The set of independent testing images may be generated using 3D cryo-imaging.

In one embodiment, training circuit 751 optimizes classifier parameters. In this embodiment, the training circuit optimizes the regularization parameter and the RBF Gaussian kernel's bandwidth. The training circuit 751 may optimize the classifier parameters based on a 5-fold stratified cross validation of the training set of images. In another embodiment, the set of classifier parameters may be optimized using another, different optimization approach.

Figure 8:
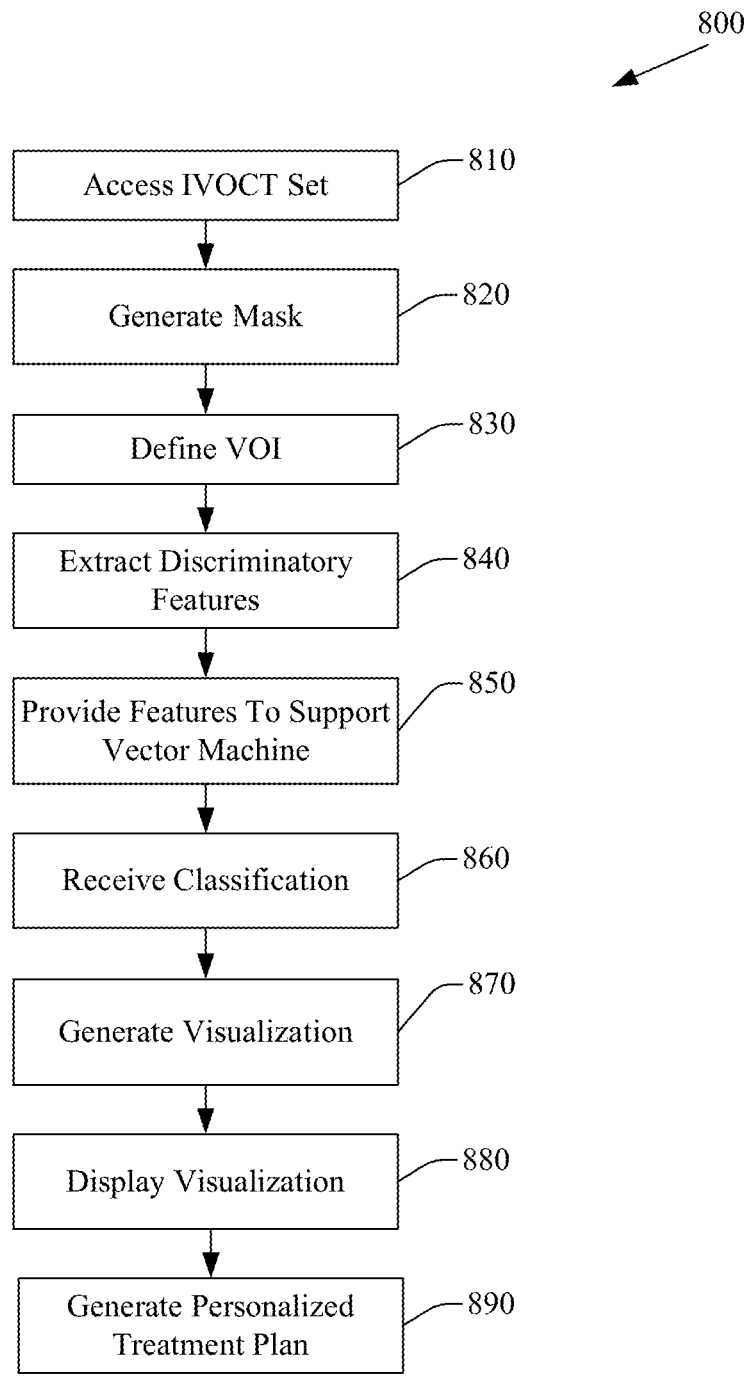
FIG. 8 illustrates an example method for generating a personalized treatment plan.

FIG. 8 illustrates an example method 800 for generating a personalized treatment plan for a patient. Method 800 includes, at 810 accessing a set of intravascular optical coherence tomography (IVOCT) images of a region of tissue demonstrating intravascular plaque. The set of IVOCT images is acquired from a patient during a PCI. A member of the set of IVOCT images includes at least one voxel. The region of tissue includes a blood vessel. In another embodiment, the diagnostic image may be acquired using other imaging modalities.

Method 800 also includes, at 820, generating a blood vessel mask by preprocessing the set of IVOCT images. Generating the blood vessel mask may include segmenting a guide wire shadow from a member of the set of IVOCT images, or segmenting a lumen and back border from the member of the set of IVOCT images. Pre-processing the set of IVOCT images may include noise reducing the set of IVOCT images, or other pre-processing actions.

Method 800 also includes, at 830, defining a volume of interest (VOI) based on the set of IVOCT images and the blood vessel mask. The VOI includes a member of the at least one voxels. The VOI may be defined as a moving box in three dimensions.

Method 800 also includes, at 840, extracting a set of discriminatory features from the member of the at least one voxels. The set of discriminatory features includes an optical feature, an intensity variation feature, or a spatial texture feature.

Method 800 also includes, at 850 providing the set of discriminatory features to a plurality of binary support vector machines (SVMs). The plurality of support vector machines includes a one-versus-rest lipid (OVR-L) SVM, an OVR-fibrous (OVR-F) SVM, and an OVR-calcium (OVR-C) SVM. In another embodiment, other types or combinations of machine learning classifiers may be employed.

Method 800 also includes, at 860, receiving, from the plurality of SVMs, a classification of the voxel. The classification of the voxel may classify the voxel as lipid, calcium, or fibrous plaque.

Method 800 also includes, at 870, generating a visualization of the blood vessel based on the IVOCT and the classification. The visualization includes a sector classification, a labeled image, or a 3D visualization.

Method 800 also includes, at 880, displaying the visualization. The visualization may be displayed substantially in real time. The visualization may be user adjustable.

Method 800 further includes, at 890, generating a personalized treatment plan for the patient from whom the set of IVOC images was acquired, based, at least in part, on the visualization and the classification. Generating the personalized treatment plan may include defining locations within a blood vessel for surgical intervention. For example, the personalized treatment plan may include location information for introducing a stent or other device into a blood vessel.

Figure 9:
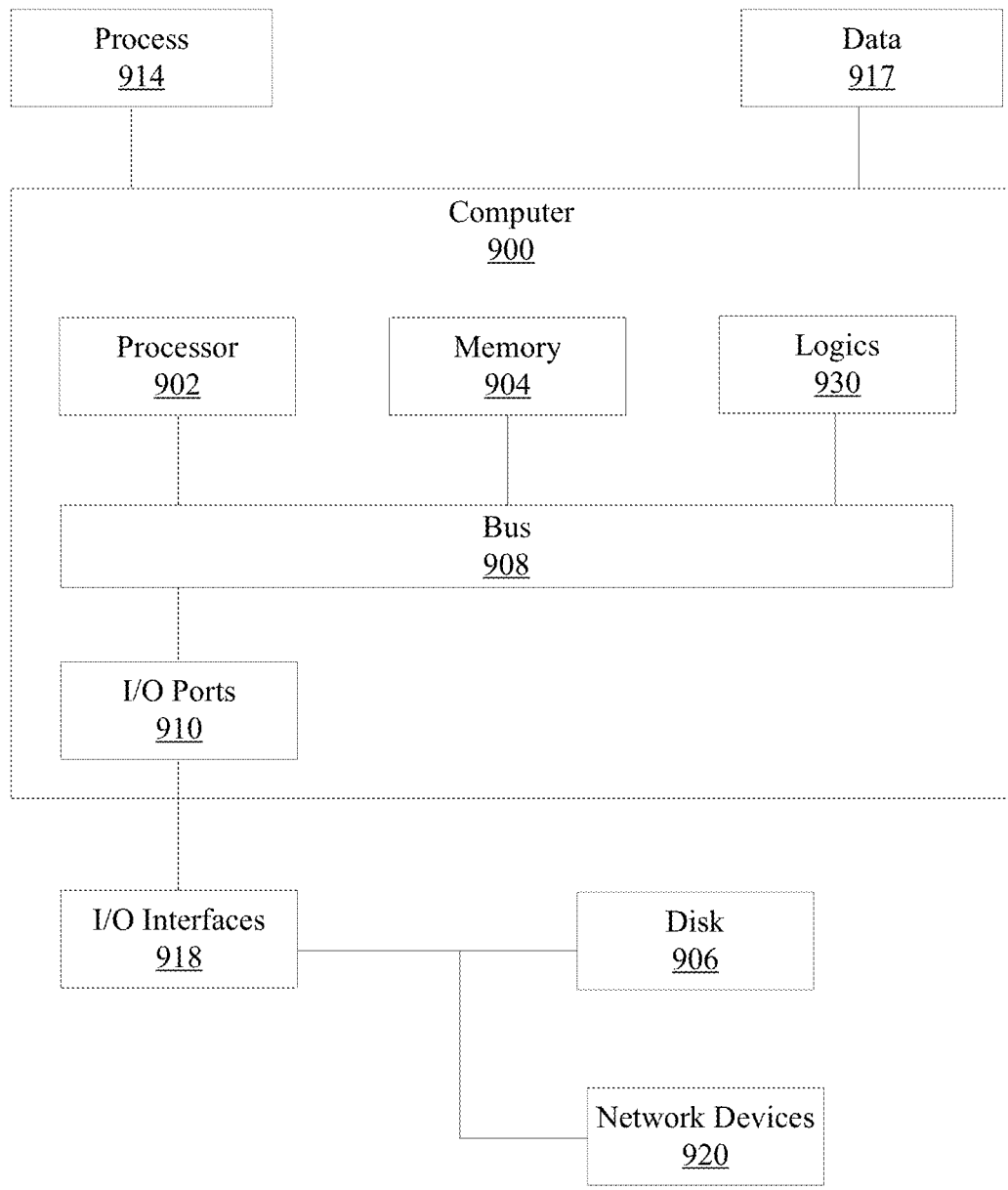
FIG. 9 illustrates an example computer in which example methods and apparatus may operate.

FIG. 9 illustrates an example computer 900 in which example methods illustrated herein can operate and in which example circuits or logics may be implemented. In different examples, computer 900 may be part of a PCI system, a cryo-imaging system, or may be part of a CADx system.

Computer 900 includes a processor 902, a memory 904, and input/output ports 910 operably connected by a bus 908. In one example, computer 900 may include a set of logics 930 that perform a method of automatically classifying plaque, or a method for training an automated deep learning classifier. Thus, the set of logics 930, whether implemented in computer 900 as hardware or firmware, and/or a combination thereof may provide means (e.g., hardware, firmware) for classifying plaque in a region of tissue imaged using IVOCT during a PCI. In different examples, the set of logics 930 may be permanently and/or removably attached to computer 900. In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 930 are implemented as ASICs or SOCs.

Processor 902 can be a variety of various processors including dual microprocessor and other multi-processor architectures. Memory 904 can include volatile memory and/or non-volatile memory. A disk 906 may be operably connected to computer 900 via, for example, an input/output interface (e.g., card, device) 918 and an input/output port 910. Disk 906 may include, but is not limited to, devices like a magnetic disk drive, a tape drive, a Zip drive, a solid state device (SSD), a flash memory card, a shingled magnetic recording (SMR) drive, or a memory stick. Furthermore, disk 906 may include optical drives like a CD-ROM or a digital video ROM drive (DVD ROM). Memory 904 can store processes 914 or data 917, for example. Disk 906 or memory 904 can store an operating system that controls and allocates resources of computer 900. Data 917 may include, for example, electronic files of IVOCT images of a region of tissue demonstrating intravascular plaque.

Bus 908 can be a single internal bus interconnect architecture or other bus or mesh architectures. While a single bus is illustrated, it is to be appreciated that computer 900 may communicate with various devices, logics, and peripherals using other busses that are not illustrated (e.g., PCIE, SATA, Infiniband, 1394, USB, Ethernet).

Computer 900 may interact with input/output devices via I/O interfaces 918 and input/output ports 910. Input/output devices can include, but are not limited to, OCT systems, IVOCT systems, cryo-imaging systems, a CT machine, a PCI apparatus, an MRI system, an optical microscope, a keyboard, a microphone, a pointing and selection device, cameras, video cards, displays, disk 906, network devices 920, or other devices. Input/output ports 910 can include but are not limited to, serial ports, parallel ports, or USB ports.

Computer 900 may operate in a network environment and thus may be connected to network devices 920 via I/O interfaces 918 or I/O ports 910. Through the network devices 920, computer 900 may interact with a network. Through the network, computer 900 may be logically connected to remote computers. The networks with which computer 900 may interact include, but are not limited to, a local area network (LAN), a wide area network (WAN), a storage area network (SAN), or other networks.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a non-transitory computer-readable medium that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, a data storage device, and other media from which a computer, a processor or other electronic device can read.

"Circuit", as used herein, includes but is not limited to hardware, firmware, software in execution on a machine, or combinations of each to perform a function(s) or an action(s), or to cause a function or action from another circuit, method, or system. Circuit may include a software controlled microprocessor, a discrete logic (e.g., ASIC), an analog circuit, a digital circuit, a programmed logic device, a memory device containing instructions, and other physical devices. Circuit may include one or more gates, combinations of gates, or other circuit components. Where multiple logical circuits are described, it may be possible to incorporate the multiple logics into one physical logic or circuit. Similarly, where a single logical circuit is described, it may be possible to distribute that single logic between multiple logics or circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing computer executable instructions that when executed by a computer control the computer to perform a method for intravascular plaque classification, the method comprising:

accessing an intravascular optical coherence tomography (IVOCT) image of a region of tissue, where the IVOCT image includes a plurality of voxels, where the region of tissue includes a blood vessel;

generating a pre-processed image by pre-processing the IVOCT image, where generating the pre-processed image includes generating a blood vessel mask;

defining a moving box (mBox) based on the pre-processed image and the blood vessel mask, where the mBox defines a three-dimensional (3D) volume of interest (VOI) centered on a location in a view of the pre-processed image, where the mBox includes at least one member of the plurality of voxels, where a scanning range of the mBox is based, at least in part, on the blood vessel mask;

extracting a set of local features from the at least one member of the plurality of voxels;

providing the set of local features to a machine learning classifier, where the machine learning classifier includes a plurality of one-versus-the-rest (OVR) support vector machine (SVM)s, where the plurality of OVR SVMs includes an OVR-lipid (OVR-L) classifier, an OVR-calcium (OVR-C) classifier, and an OVR-fibrous (OVR-F) classifier, where a member of the plurality of OVR SVMs classifies a voxel based on a probability threshold and the set of local features, where the probability threshold is computed using a minimum squared distance (MSD) approach, or a Youden index approach;

receiving, from the machine learning classifier, a classification of the at least one member of the plurality of voxels;

generating an annotated image of the region of tissue based on the classification; and controlling a percutaneous coronary intervention (PCI) apparatus to display the annotated image.

2. The non-transitory computer-readable storage device of claim 1:

where the IVOCT image is acquired during a PCI pullback;

where the IVOCT image is acquired with a 1310 nm center wavelength, a 110 nm wavelength range, a 50 kHz sweep rate, a 20 mW output power, or a 12 mm coherence length.

3. The non-transitory computer-readable storage device of claim 2, where the IVOCT image is acquired with a pullback speed of 20 mm/s, a pullback length of 54 mm, where the pullback includes at least 270 image frames spaced at least 200 μm apart.

4. The non-transitory computer-readable storage device of claim 1, where pre-processing the IVOCT image includes:

generating a noise reduced image based on the IVOCT image;

subtracting a baseline intensity from the noise reduced image;

correcting the noise reduced image using optical image system correction;

generating a segmented image by segmenting a lumen and a back border from the noise reduced image;

generating a lumen border by correcting for catheter eccentricity with respect to a vessel wall, based on the segmented image;

defining a guide wire shadow in the segmented image;

generating the blood vessel mask based on the guide wire shadow, the lumen border, and the back border; and linearizing an exponential attenuation model of an IVOCT signal.

5. The non-transitory computer-readable storage device of claim 1, where the set of local features includes an optical feature set, an intensity variation feature set, or a spatial texture feature set.

6. The non-transitory computer-readable storage device of claim 5, where the optical feature set includes an attenuation coefficient feature, a reflected intensity feature, a distance to lumen feature, a beam penetration depth feature, a beam incident angle feature, or a mean intensity feature.

7. The non-transitory computer-readable storage device of claim 5, where the intensity variation feature set includes a homogeneity feature, a relative smoothness of intensity feature, or an entropy feature.

8. The non-transitory computer-readable storage device of claim 5, where the spatial texture feature set includes a contrast feature, a correlation feature, an energy feature, or a co-occurrence homogeneity feature.

9. The non-transitory computer-readable storage device of claim 1, where displaying the annotated image includes displaying, substantially in real time:
- a sector classification image, where the sector classification image includes a masked frame of the region of tissue, where the masked frame includes a plurality of sectors, where a sector includes a representation of a type of plaque detected in the sector displayed at the perimeter of the sector;
- a labeled image of the region of tissue; or
- a three dimensional (3D) volumetric visualization of the region of tissue, where the 3D volumetric visualization includes an overlay that indicates a plaque type within the region of tissue.

10. The non-transitory computer-readable storage device of claim 1, the method further comprising training the OVR-L classifier, the OVR-C classifier, or the OVR-F classifier.

11. The non-transitory computer-readable storage device of claim 10, where training the OVR-L classifier, the OVR-C classifier, or the OVR-F classifier includes:
- accessing a clinical training data set, where the clinical training data set includes a set of IVOCT images acquired during a PCI pullback;
- training the OVR-L classifier, the OVR-C classifier, or the OVR-F classifier using the clinical training data set;
- accessing an independent validation set, where the independent validation set includes a set of voxels labeled using a 3D cryo-imaging approach;
- testing the OVR-L classifier, the OVR-C classifier, or the OVR-F classifier using the independent validation set; and
- optimizing a set of classifier parameters based on a 5-fold stratified cross validation of the clinical training data set.

12. The non-transitory computer-readable storage device of claim 1, the method further comprising generating a post-processed image by applying a sized-based filter to the annotated image.

13. An apparatus, comprising:
- a processor;
- a memory;
- an input/output interface;
- a set of circuits, where the set of circuits includes an image acquisition circuit, a pre-processing circuit, a feature extraction circuit, a classification circuit, and a visualization circuit; and
- an interface to connect the processor, the memory, the input/output interface and the set of circuits:
- where the image acquisition circuit accesses a set of intravascular optical coherence tomography (IVOCT) images of a region of tissue, where a member of the set of IVOCT images includes a plurality of voxels, where a member of the plurality of voxels includes a set of discriminative features, where the region of tissue includes a blood vessel;
- where the pre-processing circuit generates a blood vessel mask based on the set of IVOCT images, where the pre-processing circuit provides the blood vessel mask to the feature extraction circuit;
- where the feature extraction circuit defines a moving box (mBox), where the mBox defines a three dimensional (3D) volume of interest centered on a location in the member of the set of IVOCT images, where the mBox includes at least one member of the plurality of voxels, where the mBox is defined by a set of dimensions and the blood vessel mask, where the feature extraction circuit extracts the set of discriminative features from the at least one member of the plurality of voxels, and where the feature extraction circuit provides the set of discriminative features to the classification circuit;
- where the classification circuit generates a classification of the voxel as a type of plaque based on a probability that the voxel represents the type of plaque, where the probability is based, at least in part, on the set of discriminative features, where the classification circuit includes a plurality of one-versus-the-rest (OVR) support vector machines (SVM)s, where a first member of the plurality of OVR SVMs is an OVR-lipid (OVR-L) classifier, where a second, different member of the plurality of OVR SVMs is an OVR-calcium (OVR-C) classifier, and where a third, different member of the plurality of OVR SVMs is an OVR-fibrous (OVR-F) classifier, where a member of the plurality of OVR SVMs classifies a voxel based on a probability threshold and the set of discriminative features, where the classification circuit computes the probability threshold using a minimum squared distance (MSD) approach, or a Youden index approach, and where the OVR-L classifier, the OVR-C classifier, or the OVR-F classifier employs a regularization parameter and a radial basis function (RDF) Gaussian kernel; and
- where the visualization circuit generates a visualization of a member of the set of IVOCT images and the classification, where the visualization includes a sector classification image, a labeled image, or a 3D visualization, and where the visualization circuit provides the visualization to a display, substantially in real time.

14. The apparatus of claim 13, where the image acquisition circuit acquires the set of IVOCT images during a percutaneous coronary intervention (PCI) pullback, where the PCI pullback has a pullback speed of 20 mm/s, a pullback length of 54 mm, and where the pullback includes at least 270 image frames spaced at least 200 µm apart, and where a member of the set of IVOCT images is acquired using a 1310 nm center wavelength, a 110 nm wavelength range, a 50 kHz sweep rate, a 20 mW output power, or a 12 mm coherence length.

15. The apparatus of claim 13, where the set of discriminative features includes an optical feature set, an intensity variation feature set, or a spatial texture feature set,
- where the optical feature set includes an attenuation coefficient feature, a reflected intensity feature, a distance to lumen feature, a beam penetration depth feature, a beam incident angle feature, or a mean intensity feature,
- where the intensity variation feature set includes a homogeneity feature, a relative smoothness of intensity feature, or an entropy feature, and where the spatial texture feature set includes a contrast feature, a correlation feature, an energy feature, or a co-occurrence homogeneity feature.

16. The apparatus of claim 13, where the set of circuits further comprises a training circuit that:
trains the classification circuit using a training set of images, where the training circuit accesses the training set or a set of independent testing images, where a member of the training set represents a region of tissue demonstrating lipid plaque, calcified plaque, or fibrous plaque;
tests the classification circuit using the set of independent testing images, where a member of the set of independent testing images includes a volume of interest labeled as lipid plaque, calcified plaque, or fibrous plaque using 3D cryo-imaging; and
optimizes the regularization parameter and the RDF Gaussian kernel's bandwidth.

17. A non-transitory computer-readable storage device storing computer executable instructions that when executed by a computer control the computer to perform a method, the method comprising:
accessing a set of intravascular optical coherence tomography (IVOCT) images of a region of tissue demonstrating intravascular plaque, where the set of IVOCT images is acquired from a patient during a percutaneous coronary intervention (PCI), where a member of the set of IVOCT images includes at least one voxel, where the region of tissue includes a blood vessel;
generating a blood vessel mask by preprocessing the set of IVOCT images;
defining a volume of interest (VOI) based on the set of IVOCT images and the blood vessel mask, where the VOI includes a member of the at least one voxels;
extracting a set of discriminatory features from the member of the at least one voxels, where the set of discriminatory features includes an optical feature, an intensity variation feature, or a spatial texture feature;
providing the set of discriminatory features to a plurality of support vector machines (SVMs), where the plurality of support vector machines includes a one-versus-rest lipid (OVR-L) SVM, an OVR-fibrous (OVR-F) SVM, and an OVR-calcium (OVR-C) SVM;
receiving, from the plurality of SVMs, a classification of the voxel;
generating a visualization of the blood vessel based on the IVOCT and the classification, where the visualization includes a sector classification, a labeled image, or a 3D visualization;
displaying the visualization; and
generating a personalized treatment plan for the patient, based, at least in part, on the visualization and the classification.

* * * * *